United States Patent Office 3,833,514
Patented Sept. 3, 1974

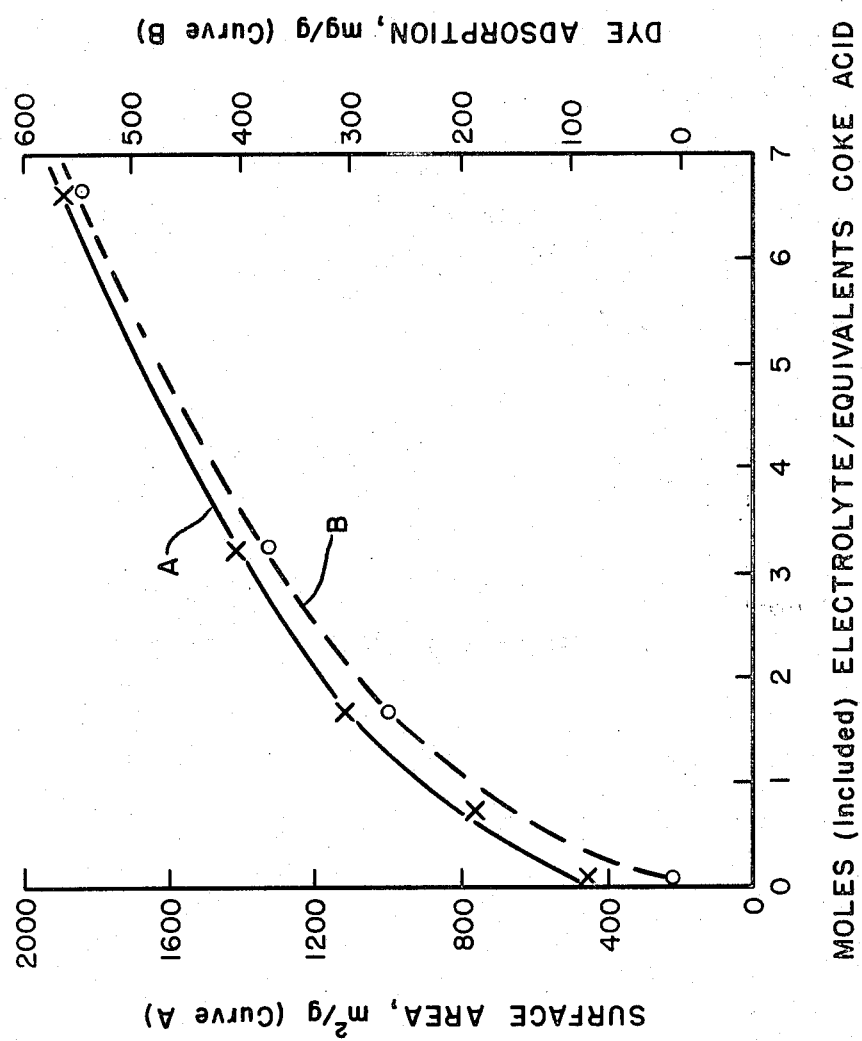

3,833,514
PROCESS FOR THE PRODUCTION OF
ACTIVATED CARBON
Arnold N. Wennerberg, Chicago, Ill., and Robert M. Alm, Crown Point, Ind., assignors to Standard Oil Company, Chicago, Ill.
Continuation of abandoned application Ser. No. 706,146, Feb. 16, 1968. This application Mar. 24, 1971, Ser. No. 127,854
Int. Cl. C01b 31/08
U.S. Cl. 252—422          8 Claims

ABSTRACT OF THE DISCLOSURE

Process for the production of active carbon by treating an aromatic acid with a suitable electrolyte to form the salt of the acid and thermally decomposing the salt to produce an active carbon; and the product produced by such process.

---

This application is a continuation of application Ser. No. 706,146, filed Feb. 16, 1968, now abandoned.

BACKGROUND OF THE INVENTION

This invention relates to activated carbons and a process for the production of activated carbons.

During the last several years there has been an increasing need for activated carbons, specifically in the area of water purification. Activated carbons have also found use in the following applications: catalyst support, hydrocarbon separations, and as a general adsorbent. The production of low cost, efficient carbons for large scale use has been difficult to achieve. The most critical factors of such carbons are the provision of high surface areas, satisfactory pore size and pore distribution and selectivity of the carbon product.

Conventional processes generally involve the destructive distillation of organic matter in order to generate high surface area. These processes, in general, suffer from either too high a cost for large scale use, too low a yield, or insufficient surface area and selectivity. Activated carbons of vegetable origin are widely known but have the disadvantage of too high a cost for large scale use as would be required in water purification.

SUMMARY OF THE INVENTION

We have now discovered a process for the production of activated carbons of low cost and high efficiency. The process of the present invention is unique for generation of activated carbons in providing extremely high surface area, as well as control of pore size and pore distribution and selectivity of the active carbon product. The active carbons of the present invention have been found to have considerably higher surface areas than commercial products produced at substantially higher costs.

The FIGURE is a plot showing surface area as a function of quantity of electrolyte.

Briefly, the process of the present invention comprises the treating of an aromatic acid with a suitable electrolyte to at least form the salt of the acid, and the subsequent thermal decomposition of the salt to form the active carbon. The water soluble impurities are washed out after the decomposition step. It has been found that the formation of the salt allows the product to be solubilized prior to thermal decomposition so as to permit alignment of the molecules in a uniformly dispersed fashion with electrolyte in turn uniformly dispersed within the molecular structure. It is thought that the electrolyte is a "blocking" or "defecting" agent. Upon drying and thermal decomposition a highly cross linked carbon structure is formed within which the included electrolyte along with salts formed by decomposition occupy and maintain the defect (pore) volume during the carbonization process. When the electrolyte is removed from the product carbon structure, a defect volume or pore space and (related surface area) is retained in the interlocking, stabilized carbon structure. It can be readily understood that this technique now makes it possible to control pore size, pore size distribution, and surface area by control of the uniformity of distribution of electrolyte in the salt formation step but also by the amount or volume of a given electrolyte included in the salt formation step prior to pyrolysis. Pyrolysis thereafter provides the means for interlocking the carbon structure within which the defecting electrolyte is placed, i.e., stabilizes the three-dimensional molecule. When electrolyte is now removed from the interlocking structure, voids (pores) are left which present a high adsorption surface area to various adsorbates. It is, therefore, preferred to incorporate as much of the defecting agent into the molecule prior to the stabilizing as possible.

The aromatic acid may be any compound having an acid radical directly attached to the benzene ring and capable of forming a soluble salt with electrolyte. Other functional groups may be present without deleterious effect. The acid radical may be COOH, $SO_3H$, $SO_2NH_2$, $PO_3H$, etc. Aromatic carboxylic acids are preferred, and may be simple monocarboxylic acids, such as benzoic acid or polycarboxylic acids, such as terephthalic, polynuclear carboxylic acids, such as naphthoic acid, or polynuclear polycarboxylic acid, such as coke acid. It is also contemplated that the aromatic carboxylic acids may be derived from any suitable carbonaceous material which is subsequently oxidized to form the carboxylic acid. For example, petroleum coke may be oxidized to form the coke acid. The feed material may be treated, when necessary, to remove contaminants or undesirable elements. For example, petroleum coke has a metal content, which, of course, is unsuitable for obtaining an ash-free carbon, but oxidation with nitric acid serves a dual function, i.e., forms the acid and removes metals.

The electrolyte must be capable of providing the blocking or defecting effect mentioned above. It should also be of such nature and the quantity used should be sufficient to at least be capable of converting the acid to the salt form, however, the term electrolyte, as used herein, is intended to mean (1) a compound capable of forming salt with the acid used and capable of providing the blocking effect or (2) more than one compound, one of which is used to neutralize the acid and additional compound or compounds which may be added simultaneously with or subsequently to neutralization to provide higher surface areas, and/or to control pore size and distribution. It is possible that by use of an electrolyte containing ions of different sizes, different size pores will result. The ability to form the salt is necessary in order that the compound may be soluble. The solubilizing of the compound allows for proper alignment of the molecules.

The electrolyte advantageously is an alkali metal compound because of the solubility of the salts and the ease of removal after thermal decomposition. It has been found, for example, that when calcium salts are used, digestion is required for removal. The alkali metal hydroxide may be used as the electrolyte to form the salt of the acid, and excess hydroxide may be used to provide additional blocking and, hence, increase surface area. In addition to excess hydroxide, alkali metal halide, carbonate, sulfate, phosphate, nitrate, oxide and other metal ion sources, etc., may be used as the electrolyte.

Although active carbons may be prepared from salts of metals include with Groups IA and IIA, of the Periodic Table, and from ammonium, etc., the potassium salts are by far the most preferred. In fact, it is difficult to obtain surface areas of active carbons in excess of 1000 sq.

meters per gm., without additional treatment if potassium is not used. Potassium is also preferred because of its availability, cheapness and it provides high water solubility (water is, of course, a preferred solvent). Active carbons prepared by use of metals other than potassium, in spite of this, have been found to be highly desirable and highly preferred over commercial products. Another interesting and unexpected result of our invention is that although it has been found that pore size is related to the size and quantity of the defecting material, it has also been found that metals other than potassium do not provide as great an incremental increase in surface area as a result of the addition of a given excess quantity of a defecting material, as is true of potassium. Active carbons made from cations other than potassium may be produced with surface areas approaching those obtained with potassium by increasing the solubility of the salt, e.g., by raising the temperature of the solution.

The thermal decomposition of the salts is accomplished by pyrolyzing the salts in an inert atmosphere. Since no oxidants are present, this is a true thermal decomposition. Prior to pyrolysis, the solvent is removed in order to provide structural stability to the molecule incorporating the defecting agent. The drying step may be accomplished by slowly raising the temperature prior to pyrolysis. This will ensure structural integrity. However, any evaporative technique may be used. Thermal decomposition may be accomplished in a pyrolysis chamber where the alkaline decarboxylation pyrolysis is carried out. The reaction may use a fluidized technique, continuous conveyor surface or fixed bed method. The temperature should be sufficient to decompose the salt, but less than the graphitization temperature of the carbon; preferably between 450° C. and 1000° C. Temperatures between 700° C. and 800° C. are particularly preferred. The crude pyrolysate produced should then be washed to remove alkaline, by-product salts and excess alkali metal compounds. Removed products may be re-cycled for the formation of additional salts. The washed, neutral, carbon powder may then be dried and thereafter fabricated to the particular particle size or form desired. For some uses a granular adsorbent is more desirable than the powdered material (e.g., for use in bed systems). The granular adsorbent may be prepared by deposition of the salt on a suitable substrate prior to pyrolysis; the material may then be pyrolyzed, washed to remove soluble salts, and dried. Suitable solids on which the salts may be deposited are petroleum coke, ground coal, silica, alumina, ground limestone, dolomite, lime and other substances that can be heated to the temperature needed to pyrolyze the salts without being decomposed themselves.

It may be possible to minimize the evaporation of solvent required prior to pyrolysis. This would represent a saving of the heat necessary to dry the salt. The elimination of the drying step, therefore, is desirable.

To avoid the drying step, the acid may be neutralized in a saturated solution of the acid salt and the electrolyte. Upon further neutralization of acid, the salt will precipitate, and the precipitate may be filtered. The precipitate, depending upon the quantity of the electrolyte used, would also include electrolyte. It is possible that because of the highly saturated solution, gelling of the salts may occur. This can be avoided by suitable agitation.

A particular embodiment of the present invention comprises the controlled oxidation of petroleum coke to form the coke acid which may then be neutralized in water with a suitable alkali metal hydroxide or oxide to produce an aqueous solution of the coke acid salt. Excess electrolyte may then be added. The electrolyte may be basic or neutral. Water may then be removed from the salt solution, and the dried salt thermally decomposed. The water soluble by-product may then be washed with water.

The use of coke acids has been found to be particularly suitable to the present invention since the structure is of a polynuclear nature prior to pyrolysis. Although with simple aromatic carboxylic acids the yield has been found to be lower than is obtained with polynuclear acids, it is thought that the pyrolysis step provides a structurally stable, three-dimensional polynuclear molecule regardless of the acid used as feed.

Many processes are known in the art for the production of acids from corresponding carbonaceous materials. A preferred method for use in the instant process comprises the controlled oxidation of petroleum coke by use of aqueous nitric acid in the concentration range of from 20% to 80%, by weight in water. The nitric acids serve as both the oxidant and the medium for oxidation of suspended petroleum coke. Net consumption of nitric acid may be minimized by continuous air oxidation of the off gases that contain reduced oxides of nitrogen, followed by recycling and readsorption to maintain the nitric acid concentration in the reaction medium.

More specifically, suspended, finely divided coke is oxidized at atmospheric or elevated pressures in either a batch type reactor or a continuous suspension flow system. The suspended coke acid is then separated by filtration and the filtrate, aqueous nitric acid solution, may then be re-cycled for re-use in the oxidation. The crude coke acid produced may then be washed with water to remove any traces of nitric acid.

When carrying out the oxidation reaction at atmospheric pressure, the coke:nitric acid ratio may be in the range of from 1:2 to 1:10 by weight, preferably 1:5. The preferred concentration of the nitric acid is 30% to 50% by weight. The reaction temperature may vary from 50° C. to 125° C. It is preferred that the temperature initially be at the lower portion of this range and then be gradually increased to the upper portion of the range at the end of the reaction period. The reaction period may vary from 5 to 24 hours, depending upon the degree of agitation in the reactor, the degree of sub-division of the coke, the concentration of the aqueous nitric acid, and the rate of increase of temperature. For example, a 50 weight percent aqueous nitric acid solution, with a coke:acid ratio of 1:5 by weight which is vigorously agitated, may be heated from 60° C. to 120° C. for a 6 to 8 hour period to complete oxidation of the coke.

The neutralization reaction may be carried out in any suitable solvent, for example, water, water-acetone, water-tetrahydrofuran, etc. The nature of the salt will dictate the particular solvent necessary. The quantity of the electrolyte should be at least sufficient to neutralize the acid. It is preferred that substantially all the carboxyl groups be neutralized. Therefore, a pH of at least 7 is desirable, advantageously between 8 and 14. The temperature of the neutralization reaction should be sufficient to effect substantially complete solution of the product salt.

During the pyrolysis of the coke acid salt, any free acid and the salt are decarboxylated. It is preferred that any water associated with the salt be minimized prior to and during the pyrolysis step. This is advantageously accomplished in an evaporation unit. The solid salt may then be inserted in a pyrolysis chamber, and inert gas flow started in the chamber before heating to expel air that would cause high temperature oxidation. The rate of temperature rise is preferably held constant. After the maximum desired temperature is reached, the pyrolysis chamber is allowed to cool, and the inert gas flow is continued until the chamber has cooled to room temperature.

The pyrolyzed solid may then be washed of excess base and electrolyte until the pH of the filtrate is approximately 7, or slightly below. After filtration, the active carbon may be dried.

DESCRIPTION OF PREFERRED EMBODIMENTS

Example I.—Preparation of Coke Acid by Oxidation of Petroleum Coke 400 g. of petroleum coke was suspended in 2500 ml. (2856 g.) of 55% $HNO_3$ within a 3-necked 5 l. roundbottomed flask. The flask was equipped with a stirring rod and paddle inserted through the center neck. An efficient condenser and thermowell were connected to each of the two remaining side necks, respectively. The raw coke (about 20-40 mesh range) was stirred as a suspension while the reactor system temperature was raised from 25° C. to 112° C.–118° C. during the first 8 hours of reaction time. By-product gases from oxidation were vented out the condenser side during the course of reaction.

At the end of 8 hours reaction time, the spent aqueous $HNO_3$ solution was withdrawn from the suspension and replaced with a second charge of 2500 ml. (2856 g.) of 55% aqueous $HNO_3$. The reaction was continued for a second 8-hour period over a temperature range of 85° C. to 115° C. with most of the second reaction period at 100° C. to 118° C. At the completion of the second stage of oxidation, the reaction product suspension was cooled to 25° C. and the suspended coke acid product separated from unreacted aqueous $HNO_3$ by filtration.

The crude acid reaction product was washed with cold water; five consecutive washes of 2000 ml. volume per wash. The washed, finely divided product was dried in a vacuum oven to remove last traces of water. Yield of product was 480 g. having a neutralization equivalent of 240-260 mg. KOH/g.

Elemental analysis: Wt. percent
C ............................................. 63.2
H ............................................. 2.6
O ............................................. 27.2
N ............................................. 4.5
S ............................................. 2.5

Example II.—Preparation of Active Carbons

Salt preparation.—A suspension of 118.6 g. of coke acid (neutralization equivalent=260 mg. KOH/g.) in 2000 ml. $H_2O$ was dissolved by adding a solution containing 26.5 g. KOH in 200 ml. of water. The suspension was stirred for 1 hour at 70° C. to effect complete solution of the product salt. At this point, all solvent water was evaporated using a Rinco evaporator to leave the homogeneous solid salt containing slight excess of KOH. The granular salt product was further dried in a vacuum oven at 75° C.–85° C./20 mm. Hg.

Using the preceding technique, a series of potassium coke acid salts, containing increasing amounts of excess base, including potassium hydroxide, were prepared.

| Sample No. | KOH wt. (g.)/ coke acid wt. (g.) | Base equiv./ acid equiv. |
|---|---|---|
| IIa | 13.25/118.6 | 0.425/1 |
| IIb | 26.5/118.6 | 0.85/1 |
| IIc | 53.5/118.6 | 1.7/1 |
| IId | 107.0/118.6 | 3.4/1 |
| IIe | 214.0/118.6 | 6.8/1 |

Salt pyrolysis and recovery of active carbon.—Each of the salt compositions prepared by the preceding technique were pyrolyzed under the following conditions in a rotating Vycor kiln under argon blanket:

The solid salt compositions IIa.–e. were each heated in a rotating kiln to 780° C. The rate of heating and/or duration of exposure to the temperature range 25° C. to 780° C. was the same for all samples, namely, 60 minutes. After this treatment, the pyrolyzed product was cooled under argon blanket to 25° C. and washed repeatedly to remove all basic, water soluble components in the carbon mass. Washing was continued until the final water wash was slightly acidic or the same pH as the distilled water used for washing. The product carbon was then filtered and dried in vacuum oven at 80° C/20 mm. Hg. for 25 hours.

The following tabulation compares properties of the active carbons derived from each of the compositions a. through e.

| Comp. No. | Moles of KOH/acid equiv. | B.E.T. surface $m^2/g$. | Dye adsorption methylene blue mg./g. |
|---|---|---|---|
| IIa | 0.425 | 170 | 2 |
| IIb | 0.85 | 780 | 31.4 |
| IIc | 1.7 | 1,200 | 250 |
| IId | 3.4 | 1,462 | 371 |
| IIe | 6.8 | 1,711 | 453 |

Example III

Salt preparation.—A solution was prepared containing 224 g. (1 equiv.) coke acids in 1000 g. of acetone-water solvent. To this solution is added an aqueous solution containing 90 g. (1.38 equiv.) of 86% potassium hydroxide in 150 g. of water. The salt solution was stirred for one hour after which the solvent phase was removed by evaporation. Total yield of product salt was 298 g.

Salt pyrolysis and recovery of active carbon.—50 g. of the product salt was charged to a rotating Vycor kiln under an argon blanket, and the solid salt composition was pyrolyzed in the rotating kiln at 780° C. under argon. The rate of heating and/or duration of exposure to the temperature range 25° C. to 780° C. was the same as previously used, namely, 60 minutes. After this treatment the pyrolyzed product was cooled under argon blanket to 25° C. and washed repeatedly to remove all basic, water soluble components in the carbon mass. Washing was continued until the final water wash was slightly acidic or the same pH as distilled water used for washing. The product carbon was then filtered and dried in a vacuum oven at 80° C./20 mm. Hg for 24 hours. Surface area measurement of this sample gave a B.E.T. surface area of 1000 m.$^2$/g.

Example IV

Salt preparation.—A solution containing 400 g. (1 equiv.) of wet coke acids (60% coke acid, 40% water) dissolved in 2 liters of tetrahydrofuran was prepared. To this solution was added 180 g. (2.76 equiv.) of 86% potassium hydroxide, dissolved in 300 ml. of water and the entire salt solution stirred for 1 hour. At this point, the solvent was evaporated to yield 380 g. of the dry salt.

Salt pyrolysis and recovery of active carbon.—50 g. of this salt preparation was pyrolyzed in a rotating Vycor kiln. The salt composition was heated in a rotating kiln to 780° C. under argon. The rate of heating and/or duration of exposure to the temperature range 25° C. to 780° C. was 60 minutes. After this treatment the pyrolyzed product was cooled under argon blanket to 25° C. and washed repeatedly to remove all basic, soluble water components in the carbon mass. Washing was continued until the final water wash was slightly acidic or the same pH as distilled water used for washing. Product carbon was then filtered and dried in a vacuum oven at 80° C/20 mm. Hg for 24 hours. Surface area measurement of this carbon gave a B.E.T. surface area of 1556 m.$^2$/g.

Example V

Salt preparation.—A salt solution of coke acids was prepared by dissolving 108.5 g. (0.30 equiv.) of wet coke acids (60% coke acid, 40% water) in a base solution containing 32.4 g. (0.5 mole KOH) of KOH dissolved in 1 liter of aqueous solution. To this solution was added 223.8 g. KCl (3.0 moles) dissolved in 1 liter of water. After the two solutions were combined and thoroughly mixed by adequaet stirring, the water was removed by evaporation of 75° C. to 85° C. under partial vacuum (20–30 mm. Hg) to yield a dry salt.

Salt pyrolysis and recovery of active carbon.—A 50 g. portion of the previously prepared dry salt (coprecipitate) was pyrolyzed in a rotating Vycor kiln. Pyrolysis was accomplished by heating the dry salt mass to 780° C. (max.)

under argon sweep. The rate of heating and/or duration of exposure to the temperature range 25° C. to 780° C. was 60 minutes. After this treatment, the pyrolyzed product was cooled under argon blanket to 25° C. and washed repeatedly to remove all basic and water soluble components in the carbon mass. Washing was continued until the final water wash was slightly acidic or the same pH as distilled water used for washing. Product carbon was then filtered and dried in a vacuum oven at 80° C./20 mm. Hg for 24 hours. Surface area measurement of this carbon gave a B.E.T. surface area of 1738 m.$^2$/g.

Example VI

Salt preparation.—A uniform coprecipitate of the salt of K+salt of coke acid which included $K_2CO_3$ was prepared by dissolving 108.5 g. (0.3 equiv.) of wet coke acid (60% coke acid, 40% water) in a uniform solution containing 19.3 g. (0.29 equiv.) KOH+248.76 g. (1.8 moles) $K_2CO_3$ dissolved in 1 l. of $H_2O$. The dry coprecipitated salt was obtained by evaporating under vacuum (20–25 mm. Hg) at 75–80° C. to remove solvent, $H_2O$.

Salt pyrolysis and recovery of active carbon.—A 50 g. sample of the dry salt was pyrolyzed in a rotating Vycor kiln at 780° C. under argon sweep. The duration of exposure to the temperature range 25° to 780° C. (max.) was 60 minutes. Active carbon with a B.E.T. surface area of 1679 m.$^2$/g. was obtained the following the same recovery technique shown in Example 4.

The relationship between moles of included electrolyte in the coke acid salt structure and the surface area is shown in the FIGURE. The electrolyte used is KOH. It may also be seen from the FIGURE that the surface area in terms of dye adsorption follows very closely the determined surface area. An explanation of the determination of surface area of active carbons is as follows:

The B.E.T. surface area measurement used to characterize the active carbons described in this case is a modification of the method developed earlier by S. Brunauer, P. H. Emmett, and E. Teller, J. Am. Chem. Soc., 60 309 (1938). Actual measurements were made using an Aminco Adsorptomat, an instrument developed by American Instrument Co., using the B.E.T. concept. Additional supportive data were obtained using a Gas Chromatographic technique (SOCO) which measures the total quantity of $N_2$ desorbed from an active carbon surface which has been saturated with $N_2$ at 200° C. with a $N_2$ area/molecule estimated to be 16.2 A.$^2$.

In the dye adsorption test, a sample of about 0.02 g. carbon is weighed directly into a 25 ml. Erlenmeyer flask, using a microbalance with a sensitivity of ±0.000002 g. The sample is titrated with a solution of 1.0000 g. methylene blue (Eastman White Label) in one liter of distilled water, using a 10 ml. burette. The mixture is continuously stirred with a Teflon-covered magnetic stirring bar to promote rapid adsorption. Initially, ml. quantities of titrant are added but addition gradually is reduced to the drop-at-a-time level as the end point is approached. The end point is observed by placing a drop of the titration mixture on a piece of Whatman #1 filter paper and observing the presence of unadsorbed dye in the mixture by the appearance of a blue ring or blue streamers spreading from the black spot of carbon. The end point is taken when the mixture still contains excess dye after stirring for 5 minutes.

The end point is checked by drawing some of the titration mixture into a hypodermic syringe through an $8\mu$ Millipore filter in a Swinney filter holder. At the end point, the filtrate should be a very pale blue.

Results are then expressed in mg. of methylene blue adsorbed per gram of carbon. These results can also be converted into surface area itself. An average area of 208 A.$^2$ is covered per molecule of methylene blue on porous carbons and the critical pore diameter for adsorption is about 12.4 A.

In the following examples, 5 pure aromatic acids and a mixture of acids were converted to salts and subsequently pyrolyzed at 780° C. under argon. The active carbons of these aromatic acids were prepared according to the procedure used above for preparation of active carbons from coke acids. Listed below are the conditions for the preparation of the active carbons, and the resulting surface areas.

Example VII

| Carbon derived from— | Equiv. KOH/acid equiv. | SOCO surface area, m.$^2$/g. |
|---|---|---|
| VIIa. Benzoic acid | 1 | 661 |
| VIIb. Terephthalic acid | 1 | 554 |
| VIIc. Terephthalic acid | 2 | 988 |
| VIId. Isophthalic acid | 1 | 679 |
| VIIe. Trimesic acid | 1 | 805 |
| VIIf. Trimellitic acid | 1 | 652 |
| VIIg. Mixed acids comprising: 3.2 wt. percent acetic 22.6 toluic 5.8 o-phthalic 12.1 isophthalic 8.1 terephthalic 3.1 methyldibasic 3.8 trimellitic 41.3 unidentified | 4.4 | 1,790 |

The following examples are provided in order to demonstrate the effectiveness of the use of potassium electrolytes (Example VIII) and sodium electrolytes (Example IX).

Example VIII.—Potassium Hydroxide+Salts

| Coke acids (equiv.) | KOH (equiv.) | Salt | Moles | Total electrolyte/ acid | SOCO Surface area, m.$^2$/g. |
|---|---|---|---|---|---|
| VIIIa. 1.0 | 1.0 | $K_2CO_3$ | 6.0 | 7.0/1.0 | 1,679 |
| VIIIb. 1.0 | 1.7 | KCl | 10.00 | 11.7/1.0 | 1,737 |

Example IX.—Sodium Hydroxide+Salts

| Coke acids (equiv.) | NaOH (equiv.) | Salt | Moles | Total electrolyte/ acid | SOCO Surface area, m.$^2$/g. |
|---|---|---|---|---|---|
| IXa. 1.0 | 3.3 | | | 3.3/1.0 | 392 |
| IXb. 1.0 | 8.0 | | | 8.0/1.0 | 522 |
| IXc. 1.0 | 3.3 | NaCl | 8.3 | 11.6/1.0 | 628 |

Examples VIII and IX clearly show that potassium electrolytes provide extremely high surface areas. However, it may be seen that the carbons prepared by Example IX have surface areas in the range quite useful for many applications.

We claim:

1. In the process of producing active carbon by the thermal decomposition of a salt of an aromatic acid the improvement which comprises thermally decomposing below the graphitization temperature of carbon a Periodic Group IA or IIA element of salt of an aromatic carboxylic acid in intimate mixture with an electrolyte having a Periodic Group IA or IIA cation and a hydroxide, halide, carbonate, sulfate, phosphate, nitrate or oxide anion, the amount of said electrolyte running between 1 mol per mol of said salt and 5.8 mols per mol of said salt.

2. The improved process of Claim 1 wherein said Periodic Group IA or IIA element salt of an aromatic carboxylic acid is a potassium salt.

3. The improved process of Claim 2 wherein said electrolyte contains a potassium cation.

4. The improved process of Claim 3 wherein said electrolyte is potassium hydroxide.

5. In the process of producing active carbon by the thermal decomposition of a salt of an aromatic acid the improvement which comprises thermally decomposing between 450° C. and 1000° C. a Periodic Group IA or IIA salt of coke acid, said coke acid containing as its acid functionality essentially carboxylic acid groups, in intimate mixture with an electrolyte having a Periodic Group IA or IIA cation and a hydroxide, halide, carbonate, sulfate, phosphate, nitrate or oxide anion, the amount of said electrolyte running between one mol per mol of said salt and 5.8 mols per mol of said salt.

6. The improved process of Claim 5 wherein said Periodic Group IA or IIA coke acid salt is a potassium salt.

7. The improved process of Claim 6 wherein said electrolyte contains a potassium cation.

8. The improved process of Claim 7 wherein said electrolyte is potassium hydroxide.

References Cited

UNITED STATES PATENTS

| | | | |
|---|---|---|---|
| 1,812,316 | 6/1931 | Berl | 252—425 |
| 2,673,216 | 3/1954 | Goedkoop | 260—515 |
| 1,903,705 | 4/1933 | Nikaido | 423—449 X |
| 2,216,757 | 10/1940 | Scheffler | 252—425 |
| 2,640,075 | 5/1953 | Goedkoop | 260—515 P |

OTHER REFERENCES

Berl: Trans. Faraday Society, vol. 34, 1938, pp. 1040–1052.

Kirk-Othmer Encyclopedia of Chemical Technology, 2nd ed., 1964, vol. 4, pp. 149–151.

EDWARD J. MEROS, Primary Examiner

U.S. Cl. X.R.

252—423, 425; 423—445, 449

PO-1050
(5/69)

UNITED STATES PATENT OFFICE
CERTIFICATE OF CORRECTION

Patent No.    3,833,514          Dated   September 3, 1974

Inventor(s)   Wennerberg, Arnold N. - Alm, Robert M.

It is certified that error appears in the above-identified patent and that said Letters Patent are hereby corrected as shown below:

Column 6, line 6, 3rd column of Table, the word "area" should follow the word "surface".

Column 6, line 69, "adequaet" should be spelled "adequate".

Column 7, line 27, after the word "obtained" omit "the".

Column 8, line 54, "element of salt" should be "element salt", strike "of".

Signed and sealed this 17th day of December 1974.

(SEAL)
Attest:

McCOY M. GIBSON JR.                 C. MARSHALL DANN
Attesting Officer                   Commissioner of Patents